United States Patent [19]

Suss

[11] 3,889,544
[45] June 17, 1975

[54] LEAD-SCREW-FINE ADJUSTMENT DRIVE FOR A SLIDE
[75] Inventor: Winfried Suss, Unterhaching, Germany
[73] Assignee: Karl Suss KG, Garching, Germany
[22] Filed: May 8, 1974
[21] Appl. No.: 467,920

[30] Foreign Application Priority Data
May 19, 1973 Germany.............................. 2325612

[52] U.S. Cl............................. 74/89.15; 74/424.8 A
[51] Int. Cl............................................. F16h 27/02
[58] Field of Search......... 44/89.15, 424.8, 424.8 A, 44/29

[56] References Cited
UNITED STATES PATENTS

| | | |
|---|---|---|
| 2,261,537 | 11/1941 | Zamarra ........................ 74/424.8 A |
| 2,910,883 | 11/1959 | Reed, Jr.......................... 74/424.8 R |
| 3,235,220 | 2/1966 | Rantsch et al. ................ 74/424.8 A |
| 3,640,138 | 2/1972 | Hahn et al. ........................... 74/89.15 |
| 3,736,802 | 6/1973 | Kibler ................................. 74/89.15 |
| 3,757,591 | 9/1973 | Taylor................................. 74/89.15 |

Primary Examiner—Wesley S. Ratliff, Jr.

[57] ABSTRACT

A lead screw-fine adjustment drive for a slide moveable in a straight line manner in an associated guideway along a plane parallel to a lead screw, by means of a nut engaging into the threads of the lead screw, with the plane of the nut running essentially perpendicular to the lead screw axis, and being slightly tiltable, and with an entrainment member rigidly joining the nut with the slide. The guideway is arranged to be bowed convexly toward or concavely away from the lead screw as a function of slight lengthening or shortening of the lead screw by means of adjustment members.

10 Claims, 6 Drawing Figures

3,889,544

LEAD-SCREW-FINE ADJUSTMENT DRIVE FOR A SLIDE

BACKGROUND OF THE INVENTION

The invention concerns a lead screw-fine adjustment drive for a slide that is movable in essentially a straight line manner, in an associated guideway, the slide being moveable along a plane parallel to a lead screw by means of a nut engaging into the threads of the lead screw, with the plane of the nut essentially perpendiculare to the lead screw axis and being slightly tiltable, and with an entrainment member rigidly joining the nut with the slide. Although, and in that which follows, the expression "lead screw" is continually used, and in combination with it "threads" as well as "nut", it is to be understood that, in lieu of a lead screw, a rack and pinion gear can be provided, where the teeth of the rack gear correspond to the threads and the pinion to the mode of operation of the nut.

In a known fine adjustment drive of the type mentioned, the accuracy of adjustment of the slide traverse is limited by the precision of the thread pitch of the lead screw. With the most precise present-day processing machines a thread pitch precision of about 0.125% is achievable, corresponding to an error of about $1.25 \times 10^{-2}$ mm over a spindle length of 10 cm.

This minimum error is also obtained when comparing several lead screws that were hardened in one and the same batch. The reason for the deviations lies in a differential distortion of the already threaded lead screws when hardening, whereby contraction or lengthening can occur, as well as in the further final grinding of the finish-hardened lead screw due to abrasion caused by the grinding wheel biting into the course of the thread. In the case of very high travel accuracy requirements for the slide it has not been possible up to the present time to provide the travel movement by means of rotating the lead screw through a specific angle whereby the specific angle of rotation is simply read on a micrometer screw division, or adjusted automatically by means of an electronically controlled stepping motor. More often, in such cases, the comparator principle was used where, additionally to the object to be transported, a glass guage that was to be microscopically read was laid on the slide, whereby, by observation of this glass guage, certain deviations in thread pitch of the lead screw could be corrected.

For applications with smaller objects, especially the handling of semiconductor wafers, integrated circuits and the like as used in semiconductor technology, use of the comparator principle is, however, not possible because of the space requirements. On the other hand, it is exactly in these types of applications that very high accuracies must be maintained, for example for the purpose of achieving a uniform etching of semiconductor wafers. If this etching turns out to be non-uniform, the etch lines then do not coincide with the limits of a number of microscopically smaller semiconductor wafer surfaces treated earlier and thus a relatively higher reject rate results.

SUMMARY OF THE INVENTION

The task of the invention, relative to the present state-of-the-art, is to obtain an improved lead screw-fine adjustment drive with which a higher degree of improvement in the accuracy of travel movement of the slide is possible, without use of the comparator principle, and with lesser space requirement, taking into consideration the least divergence occurring at the time relative to the thread pitch reworked lead screw. This can be achieved in that the guideway can be easily bowed convexly toward or concavely away from the lead screw as a function of a slight lengthening or shortening of the lead screw by means of adjustment members.

In accordance with the concept of the invention, precise elimination of a re-occurring error can be achieved by an equal lengthening or shortening of the thread. Where the thread lengthening or shortening is not uniform, but subjected rather, to certain deviations, the guideway can be bowed to a suitable average value which, even though not completely eliminating the error, brings about a higher mangitude of improvement in precision than has been achievable up until now. Particularly advantageous in this is that the concept of the invention can be made usable through relatively simple constructional means and applied to fine adjustment drives that have been manufactured in normal fashion in accordance with the state-of-the-art up until the present time.

DESCRIPTION OF THE PREFERRED EMBODIMENTS

Figure 2:
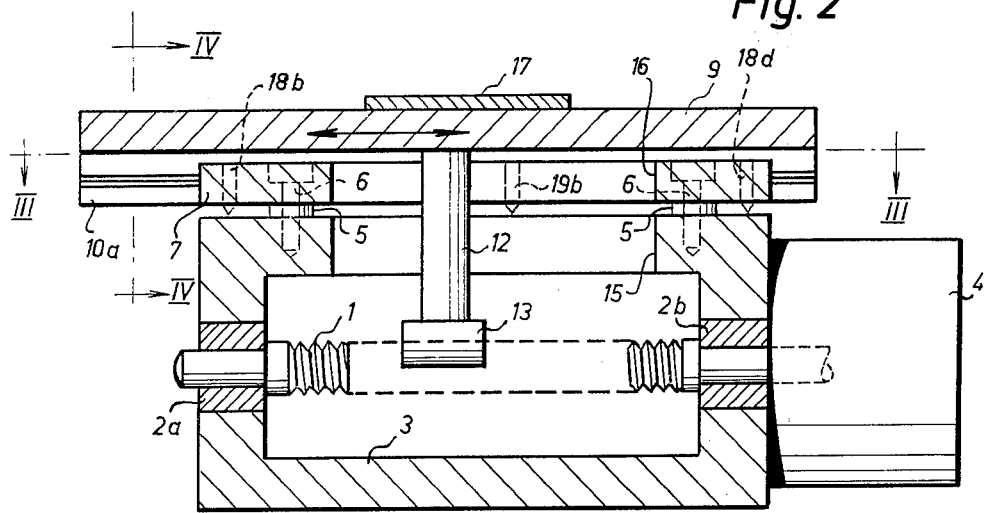
FIG. 2 is an example of one embodiment for a lead screw-fine adjustment drive that is in accordance with the invention, with only a unidimensional travel capability of an associated slide, the view being taken in an axial representation corresponding to the cut line I—I of FIG. 3.
Figure 3:
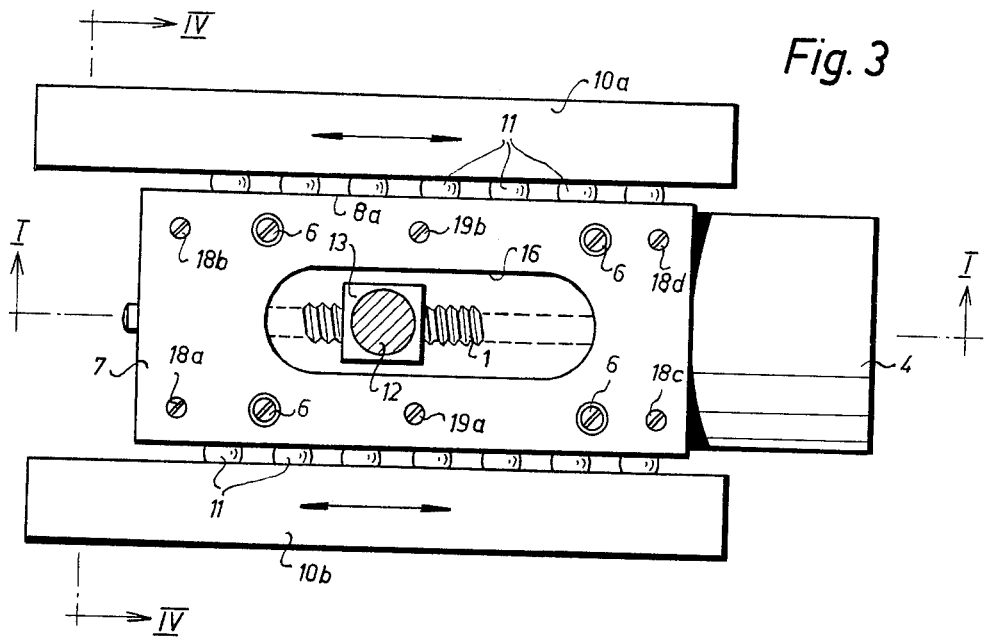
FIG. 3 is a view of a cut along line III—III of FIG. 2.
Figure 4:
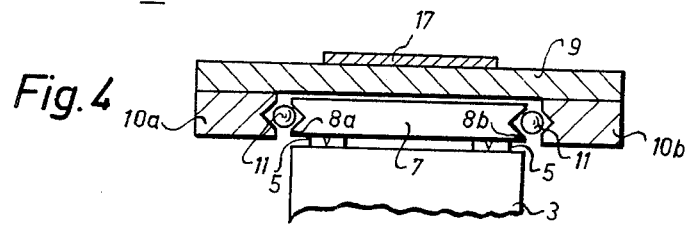
FIG. 4 is a view of a cut along line IV—IV of FIGS. 2 and 3, on a slightly reduced scale.

The fine adjustment drive shown in FIGS. 2–4 comprises a lead screw 1 which is bearingly supported in a lead screw housing 3 on bearings 2a and 2b. Flange-mounted on the lead screw housing 3 is a stepping motor 4, not shown in detail, which, upon activation through means of an electrical or electronic control arrangement (not shown), permits the lead screw 1 to rotate in one direction or the other, through a predetermined angular range, for example 15°.

Solidly affixed through means of four screws 6 (see in particular FIG. 3), at a short distance above lead screw housing 3, with interposition of spacers 5, is a guide plate 7 which displays on two parallel narrow beveled surfaces 8a and 8b, bearing grooves for longitudinal guidance ball bearings. The guide plate 7 bearingly supports a slide 9 which is rigidly joined on both sides with one each non-flexing notched guides 10a, 10b running in a straight line. The narrow beveled surfaces of notched guides 10a, 10b that face each other are shaped as bearing grooves for longitudinal guidance ball bearings, similar to the narrow beveled surfaces 8a, 8b of the guide plate 7, whereby, with the aid of intermediately lying ball bearings 11, both notched guides 10a, 10b on the one hand, and on the other hand guide plate 7, are displaceable relative to each other, as is indicated by the double arrow shown in slide 9 of FIG. 2, and by the double arrows shown in both notched guides 10a, 10b of FIG. 3.

Figure 6:
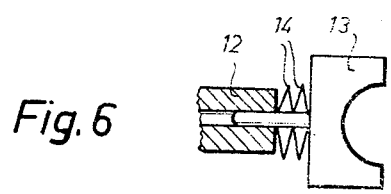
FIG. 6 is a view of some of the components contained in the fine adjustment drive that is in accordance with FIGS. 2–5, in a more exact partial representation relative to and in a view similar to FIG. 5.

Slide 9 is rigidly joined to an entrainment piece 12, which accepts on its lower end, a half-nut 13 which merely presses against half of the lead screw circumference under the tension of plate springs 14 (FIG. 6). In order that the slide 9 may be displaced in the direction given by the double arrows, the top side of the lead screw housing is provided with a slot-type recess 15, and the top side of guide plate 7 is provided with a corresponding slot-type recess 16.

The fine adjustment drive in accordance with FIGS. 2–4, insofar as described up to here, is constructed in a manner similar to the state-of-the-art and, accordingly forms no component part of the present invention. If, for example, an object in form of a wafer plate 17 is layed onto slide 9, the plate can be provided with a uniformly etched line grid, using an etching machine (not shown), if after each etching process step motor 4 is actuated, in the direction of completion of one turn of lead screw 1, through a predetermined angle, for example 15°. However, insofar as described up to this point, deviations in thread pitch of the lead screw 1 cannot be corrected by the fine adjustment drive by using the idea of slight lengthening or shortening of the thread.

The two narrow beveled surfaces 8a, 8b of guide plate 7, together form a guideway for both notched guides 10a, 10b, consequently for slide 9 as well as wafer plate 17. In accordance with the invention, adjustment members in the form of set-screws 18a, 18b, 18c, 18d, 19a, and 19b and provided on guide plate 7, with which plate 7 and, consequently also the guideway established by this latter, can be bowed convexly toward lead screw 1 or concavely away from it.

In order to achieve a convex bowing toward lead screw 1, set-screws 19 are to be screwed upwardly out of guide plate 7 somewhat so that they no longer engage against the upper surface of lead screw housing 3, which is built in the form of a rigid reference member running approximately parallel to the guideway as well as to the plane of guide plate 7 when in the unbowed condition. On the other hand, set-screws 18a through 18d are to be drawn down in pairs such that they abut against lead screw housing 3 and thus push the left and right hand ends of guide plate 7 away from lead screw housing 3, in the direction as viewed in FIGS. 2 and 3.

This in turn leads to the sought for slight convex bowing of guide plate 7, in its center region, toward lead screw 1.

If the center portion of guide plate 7 is to be bowed concavely away from lead screw 1, then set-screws 18a through 18d are to be loosened by backing them off upwardly away from their contacting engagement with lead screw housing 3 and, instead, bringing set-screws 19a, 19b into a contacting engagement with lead screw housing 3 by turning them inwardly.

Figure 1:
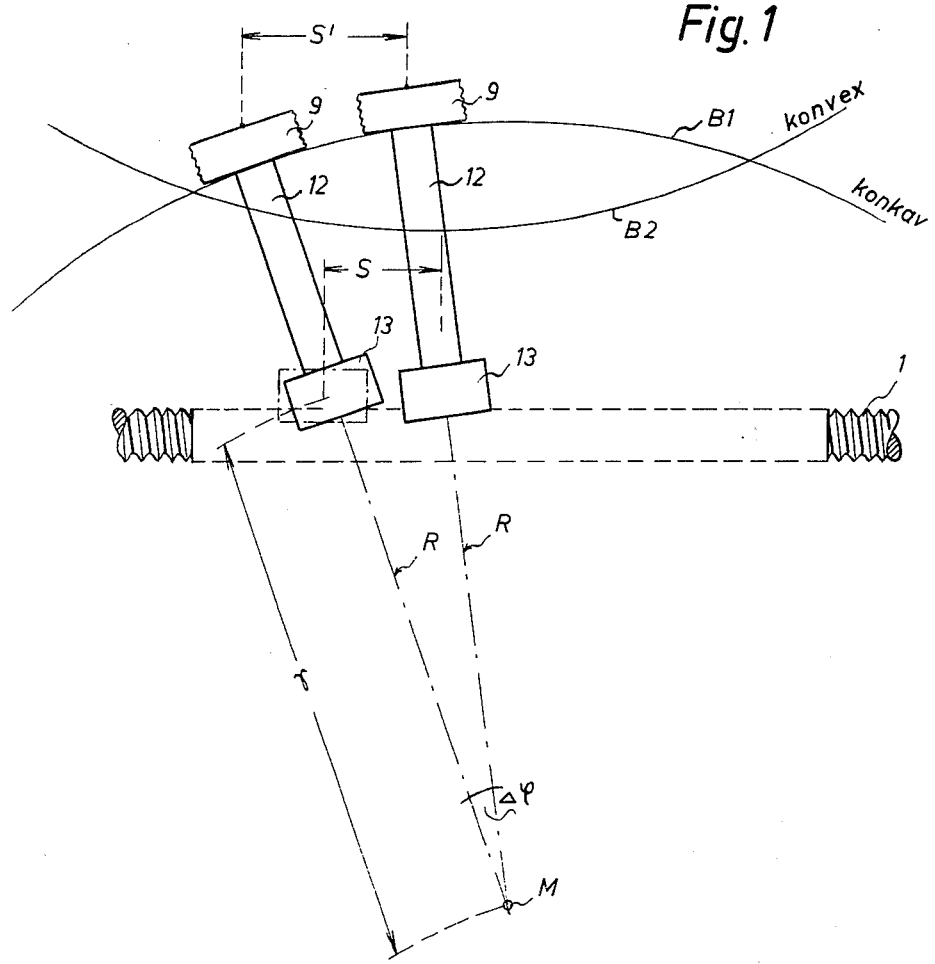
FIG. 1 is a schematic sketch for illustrating the basic concept of the present invention.

Described more completely in the following, and in conjunction with FIG. 1, is the operation of this type of bowing of the guide plate 7, along with the guideway formed by this latter, and, to be sure, principally for the case of a concave bowing, whereby the explanations for a convex bowing can be read off in analogous fashion.

Shown in FIG. 1 is a strongly over-stressed concave bowing of guide plate 7 which leads to establishment of a concavely bowed guideway B1. Guideway B1 has an average radius R with an axis of bowing M1; additionally, there is an interval r from the axis of bowing M to half-nut 13. It should be presumed that the lead screw has undergone a slight shortening of the thread for some reason or another (for example, in the tempering oven). Let the left hand position of slide 9, as viewed in FIG. 1, along with associated entrainment member 12 and associated half-nut 13, be considered the initial position and let the task be assigned to displace the upper surface of slide 9 a given distance S' toward the right, as viewed in FIG. 1. Let it further be assumed that, because of the presumed shortening of the thread, lead screw 1 in turning through a given range of angle will displace half-nut 13 in a path S<S'.

In displacing slide 9 from the initial position to the final position, from left to right as viewed in FIG. 1, the angle of swing of slide 9, and along with this also the angle of swing of the components associated with this latter, namely of entrainment member 12 as well as half-nut 13, changes by an angle $\Delta\phi$. From this we have:

$$S' = R \Delta\phi \qquad [1]$$

$$S = r \Delta\phi \qquad [2]$$

From [2] follows:

$$\Delta\phi = S/r \qquad [3]$$

From this, for the difference between desired travel path S' and the travel path S effected by lead screw 1, in a first approximation there follows:

$$S' - S = (R/r - 1)S \qquad [4]$$

From [4] it follows that as $R \to \infty$ the right hand portion of the equation $\to 0$, while, because of the predetermined short length of entrainment member 12, the relationship $R/r \to 1$. Hence, in the case of an infinitely large radius of curvature R, even if travel path B1 becomes a straight line, the difference $S' - S$ becomes equal to 0, which corresponds to the non-corrected case. In all other cases, if the radius of curvature R is very great relative to the length of entrainment member 12, travel path S' becomes somewhat greater than travel path S' transferred by lead screw 1 so that, as a consequence, a slight shortening of the lead screw thread can be exactly compensated for by concave adjustment of the guideway.

In exactly analogous manner, it can be shown that, in the case of a convex bowing of guide plate 7, corresponding to achieving a convexly bowed guideway B2, the travel path S' measured on the upper surface of slide 9 is constantly less than the travel path S actually transferred from lead screw 1 to half-nut 13 so that, in this case also, exact compensation for a lengthening of the thread of lead screw 1 can be accomplished.

As can be gathered from the foregoing description of the example of embodiment according to FIGS. 2–4 and explanations for FIG. 1, the concept of the invention is most favorably applied if the guidance of slide 9 and of its notched guides 10a, 10b, relative to guide plate 7 is effected through means of ball bearing raceways. The reason for this lies in the fact that the diametrically opposed crowns of ball bearings 11, in the direction of travel, necessarily contact against the corresponding portions of the respective ball bearing raceways. As brought into consideration in accordance with the invention, by slight bowing of guide plate 7, the guideways B1 or B2 thusly adjusted in accordance with FIG. 1 can respectively be considered as rectilinear portions of arc between the crests of two adjacent ball bearings contacting against the ball bearing raceway so that no essential stresses are transferred to the ball bearing raceways nor any deforming loads to the ball bearings.

As obtained from FIG. 1, the adjustment of the amount of bowing of guide plate 7 provided for, in accordance with the invention, is always carried out for a given surface area of slide 9. No compensation for the error in lead screw 1 is achieved for all planes that run parallel at intervals to this. If, for example, the object, here wafer plate 17, displays a certain thickness and etching of the top surface of wafer plate 17 is to be carried out, then the adjustment provided for in accordance with the invention is not undertaken relative to the top surface of slide 9 but is, rather, best adjusted to the top surface of wafer plate 17. Likewise, calibration can already be done during manufacture because, with these types of devices, it is almost always known for what purpose the overall device will be used.

Calibration of the fine adjustment drive that is in accordance with the invention is carried out using the compensation principle by means of a usual type comparison standard of known thickness which is layed onto the top surface of slide 9 and observed microscopically during actuation of lead screw 1.

While in the case of the fine adjustment drive in accordance with FIGS. 2–4 the lead screw is arranged below guide plate 7, where the entrainment member 12 runs perpendicularly to the plane of travel of slide 9, according to FIG. 5, on the other hand, it is possible to construct a modified fine adjustment drive wherein lead screw 1 is associated with a lead screw housing 3' next to guide plate 7, where the entrainment member 12 running parallel to the plane of travel of slide 9 is connected directly with a portion of slide 9 that faces toward lead screw 1. In general, the parts in FIG. 5 that operate in the same manner as those of the example of embodiment of FIGS. 2–4 carry the same number designations and are not explained again here.

Figure 5:
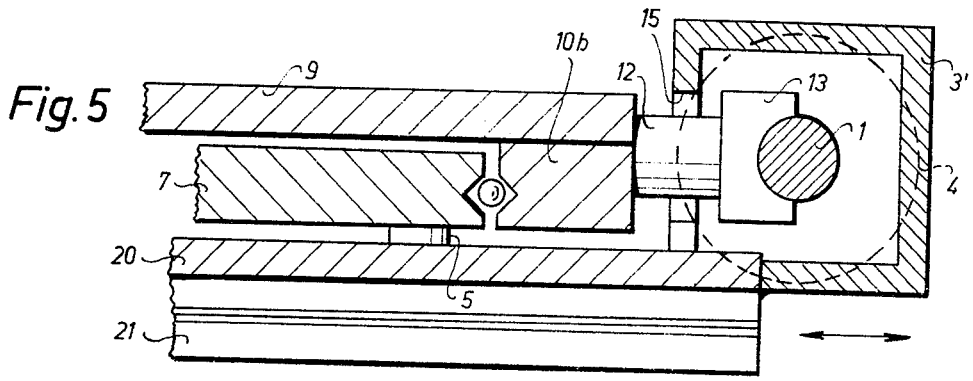
FIG. 5 is a view of an example of an embodiment, partially broken away, of a lead screw-fine adjustment drive that is in accordance with the invention, for a two-slide equipped compound table, where the first slide of the compound table is shown in a representation similar to FIG. 2, and the second slide, which is movable over the first slide, is shown in a representation similar to FIG. 4.

The example of embodiment in FIG. 5 is designed primarily for application in conjunction with a compound table displaying two slides that are movable perpendicularly to each other in parallel planes; in the case being considered, additionally to slide 9 another slide 20 with two notched guides 21 (corresponding analogously to notched guides 10a, 10b of slide 9, although in FIG. 5 only one notched guide 21 is shown), where the first slide 20, over which second slide 9 is movable, is constructed as a rigid reference member for the second slide 9. In other words, then, the first slide 20, relative to set-screws 18a through 18d, 19a, 19b (not shown) of guide plate 7, takes over the same support function as the upper surface of lead screw housing 3 in the case of the example of embodiment of FIGS. 2–4. Accordingly, in the example of embodiment of FIG. 5, guide plate 7, relative to the first slide 20, can be bowed such that the axis of bowing runs parallel to the plane of the sketch.

Although not shown in FIG. 5, a lead screw-fine adjustment drive that is in accordance with the invention and analogous to components 1, 3', 4, 5, 7, 9, 10b, 12, 13, 15 of FIG. 5 can be associated to slide 20 or, a fine adjustment drive according to FIGS. 2–4 can also be associated to slide 20, where the lead screw for slide 20 is bearingly mounted in a lead screw housing arranged below same (slide 20). The example of embodiment in accordance with FIG. 5 is, meanwhile, not limited to compound tables with two slides that are movable perpendicularly to one another, rather it can also very well be applied to a unidimensionally movable slide. In this case, the first slide 20 need merely be considered as a fixed, rigid reference member.

I claim:

1. In a lead screw-fine adjustment drive for a slide reciprocably movable in essentially a straight line manner within an associated guideway, the slide being movable along a plane parallel to a lead screw by means of a nut engaging into the threads of the lead screw, with the plane of the nut running essentially perpendicular to the lead screw axis, and being slightly tiltable, and with an entrainment member rigidly joining the nut with the slide, said drive being characterized in that means are provided for bowing the guideway convexly toward or concavely away from the lead screw as a function of effectively slightly lengthening or shortening of the lead screw by means of transversely disposed adjustment members.

2. The fine adjustment drive in accordance with claim 1 being characterized in that said adjustment members are set-screws.

3. The fine adjustment drive in accordance with claim 2 being characterized in that said set-screws are provided at opposed outer ends of the guideway as well as in its center region and that a rigid reference member extends approximately parallel to the guideway against the surface of which the set-screws are brought into contacting engagement.

4. The fine adjustment drive in accordance with claim 1 being characterized in that the nut engaging into the said lead screw thread consists of a half-nut which, under tension presses against half of the lead screw circumference.

5. The fine adjustment drive in accordance with claim 1 being characterized in that the guideway is formed by two laterally opposed parallel narrow beveled surfaces of a guide plate forming bearing races.

6. The fine adjustment drive in accordance with claim 5 being characterized in that said slide is equipped on both sides with a rigid notch guide between the opposed narrow beveled surfaces of which is carried said relatively displaceable guide plate.

7. The fine adjustment drive in accordance with claim 6 being characterized in that the said narrow beveled surfaces of the guide plate and the non-flexible notched guides of the slide are constructed as ball bearing raceways with ball bearings carried between them.

8. The fine adjustment drive in accordance with claim 6 being characterized in that the said lead screw is arranged below the said guide plate which, along the longitudinal axis of the guideway, is provided with a slot-type recess through which an entrainment member, running perpendicularly to the plane of travel of said slide, extends from said nut to said slide.

9. The fine adjustment slide in accordance with claim 8 being characterized in that the said lead screw is arranged adjacent said guide plate and that said entrainment member extends generally parallel to the plane of travel of said slide and is directly joined with that portion of the slide facing the lead screw.

10. The fine adjustment slide as set forth in claim 9 being characterized in that two lead screw-fine adjustment drives are provided to a compound table utilizing first and second slides movable perpendicularly, one to another in parallel planes, and wherein the said first slide, over which the said second slide is movable, is constructed as a rigid reference member for said second slide.

* * * * *